(12) United States Patent
Tseng

(10) Patent No.: US 9,090,031 B2
(45) Date of Patent: Jul. 28, 2015

(54) POSITIONING DEVICE FOR RUNNER SYSTEMS

(75) Inventor: Min-Tsang Tseng, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 246 days.

(21) Appl. No.: 13/612,910

(22) Filed: Sep. 13, 2012

(65) Prior Publication Data

US 2013/0168912 A1 Jul. 4, 2013

(30) Foreign Application Priority Data

Dec. 28, 2011 (TW) .............................. 100149254 A

(51) Int. Cl.
| | | |
|---|---|---|
| B29D 11/00 | (2006.01) |
| B05B 13/02 | (2006.01) |
| B25B 13/06 | (2006.01) |
| B26D 7/01 | (2006.01) |
| B29C 45/38 | (2006.01) |

(52) U.S. Cl.
CPC ...... B29D 11/00432 (2013.01); B05B 13/0285 (2013.01); B25B 13/06 (2013.01); B25B 13/065 (2013.01); B26D 7/01 (2013.01); B29C 45/382 (2013.01); B29D 11/0024 (2013.01); *B26F 2210/06* (2013.01)

(58) Field of Classification Search
USPC .......................................................... 269/58
See application file for complete search history.

(56) References Cited

U.S. PATENT DOCUMENTS

| | | | | |
|---|---|---|---|---|
| 3,086,414 | A * | 4/1963 | Nardi ........................... | 81/176.1 |
| 5,048,378 | A * | 9/1991 | Nikolas ........................ | 81/124.2 |
| 5,148,727 | A * | 9/1992 | Williamson .................. | 81/121.1 |
| 5,697,268 | A * | 12/1997 | Makovsky et al. ............ | 81/125 |
| 5,762,081 | A * | 6/1998 | Keene et al. ..................... | 134/59 |
| 5,969,793 | A * | 10/1999 | Dobner ......................... | 351/247 |
| 5,974,916 | A * | 11/1999 | Lassiter ....................... | 81/121.1 |
| 5,996,447 | A * | 12/1999 | Bayouth ...................... | 81/176.2 |
| 6,360,634 | B1 * | 3/2002 | Leitch .......................... | 81/124.2 |
| 6,715,384 | B1 * | 4/2004 | Kozak .......................... | 81/124.2 |
| 7,661,338 | B2 * | 2/2010 | Kochling ..................... | 81/121.1 |
| 8,403,312 | B2 * | 3/2013 | Zhang et al. .................... | 269/58 |
| 8,479,616 | B2 * | 7/2013 | Tsai .............................. | 81/125 |
| 2007/0163400 | A1 * | 7/2007 | Parise .......................... | 81/176.1 |
| 2008/0011128 | A1 * | 1/2008 | Stephens ..................... | 81/124.2 |
| 2008/0295650 | A1 * | 12/2008 | Hsieh .......................... | 81/177.85 |
| 2009/0223327 | A1 * | 9/2009 | Lin .............................. | 81/121.1 |
| 2010/0269641 | A1 * | 10/2010 | Chen ............................ | 81/121.1 |
| 2011/0101144 | A1 * | 5/2011 | Denning ...................... | 242/390 |
| 2011/0167966 | A1 * | 7/2011 | Liu .............................. | 81/177.8 |
| 2013/0014616 | A1 * | 1/2013 | Putsch et al. ................ | 81/121.1 |
| 2013/0276594 | A1 * | 10/2013 | Attebury et al. ................ | 81/60 |
| 2013/0340577 | A1 * | 12/2013 | Su ................................. | 81/438 |
| 2014/0026719 | A1 * | 1/2014 | Stanfield et al. ................ | 81/13 |

* cited by examiner

*Primary Examiner* — Lee D Wilson
*Assistant Examiner* — Alvin Grant
(74) *Attorney, Agent, or Firm* — Novak Druce Connolly Bove + Quigg LLP

(57) ABSTRACT

A positioning device is provided for positioning a runner system. The positioning device includes a retainer and a bearing bolt. The retainer includes a first surface and a second surface. The first surface defines a stepped hole on the first surface. The bearing bolt includes a connection portion and a location portion connected to the connection portion. The location portion is substantially in shape of a truncated-cone, and includes a free end, a connection end away from the free end, and a ring outer surface connected with the free end and the connection end. The ring outer surface is sloped. The diameter of the ring outer surface reduces from the connection end to the free end.

11 Claims, 5 Drawing Sheets

POSITIONING DEVICE FOR RUNNER SYSTEMS

BACKGROUND

1. Technical Field

The present disclosure relates to positioning devices and, particularly, to a positioning device for different types of runner systems.

2. Description of Related Art

After an injection molding product, such as a lens, is molded in a runner system, the runner system needs to be positioned on a retainer of a shearing machine for shearing the molded lens. In related art, the retainer of the shearing machine sets a blind hole. A main channel of the runner system is accommodated in the blind hole and resists against the retainer.

Different types of molded products require of different sizes of runner systems. However, the different sizes of runner systems need different types of retainers for different sizes of runner systems, this is costly.

Therefore, it is desirable to provide a positioning device which can overcome the above-mentioned limitations.

BRIEF DESCRIPTION OF THE DRAWINGS

Many aspects of the present disclosure can be better understood with reference to the following drawings. The components in the drawings are not necessarily drawn to scale, the emphasis instead being placed upon clearly illustrating the principles of the present disclosure.

DETAILED DESCRIPTION

Figure 1:
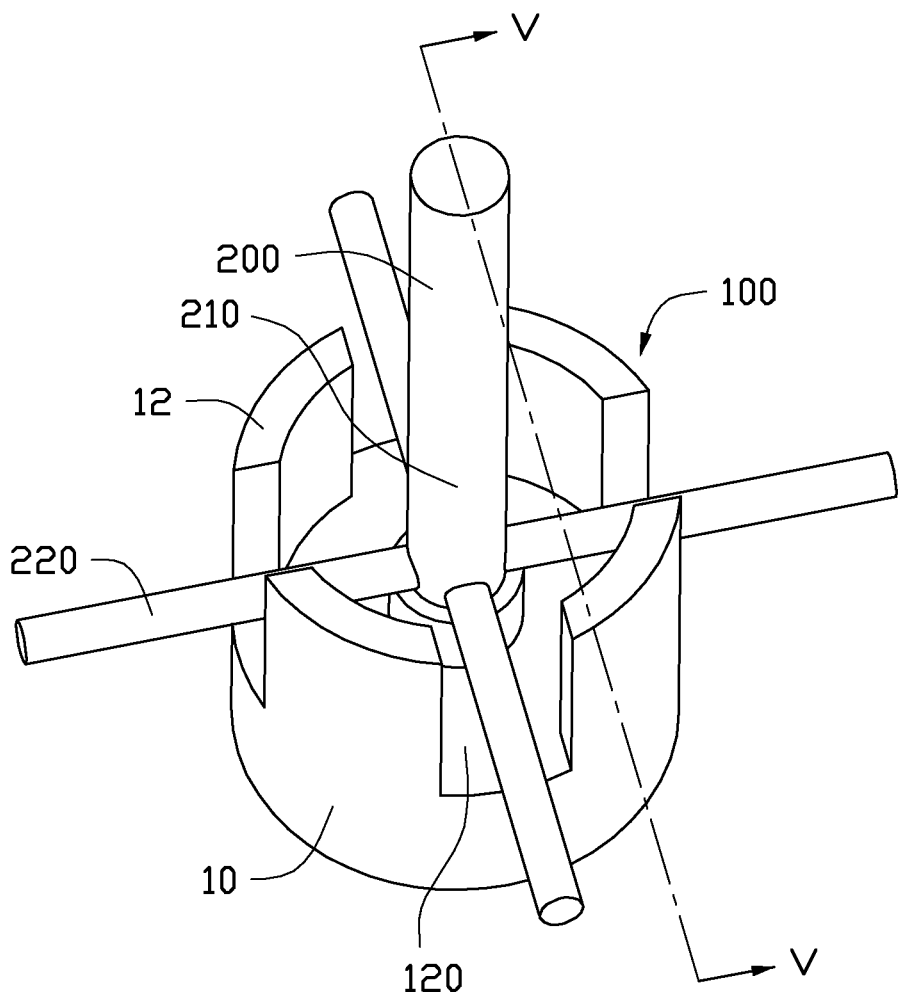
FIG. 1 is an assembled, isometric view of a positioning device together with a runner system, according to an exemplary embodiment.
Figure 2:
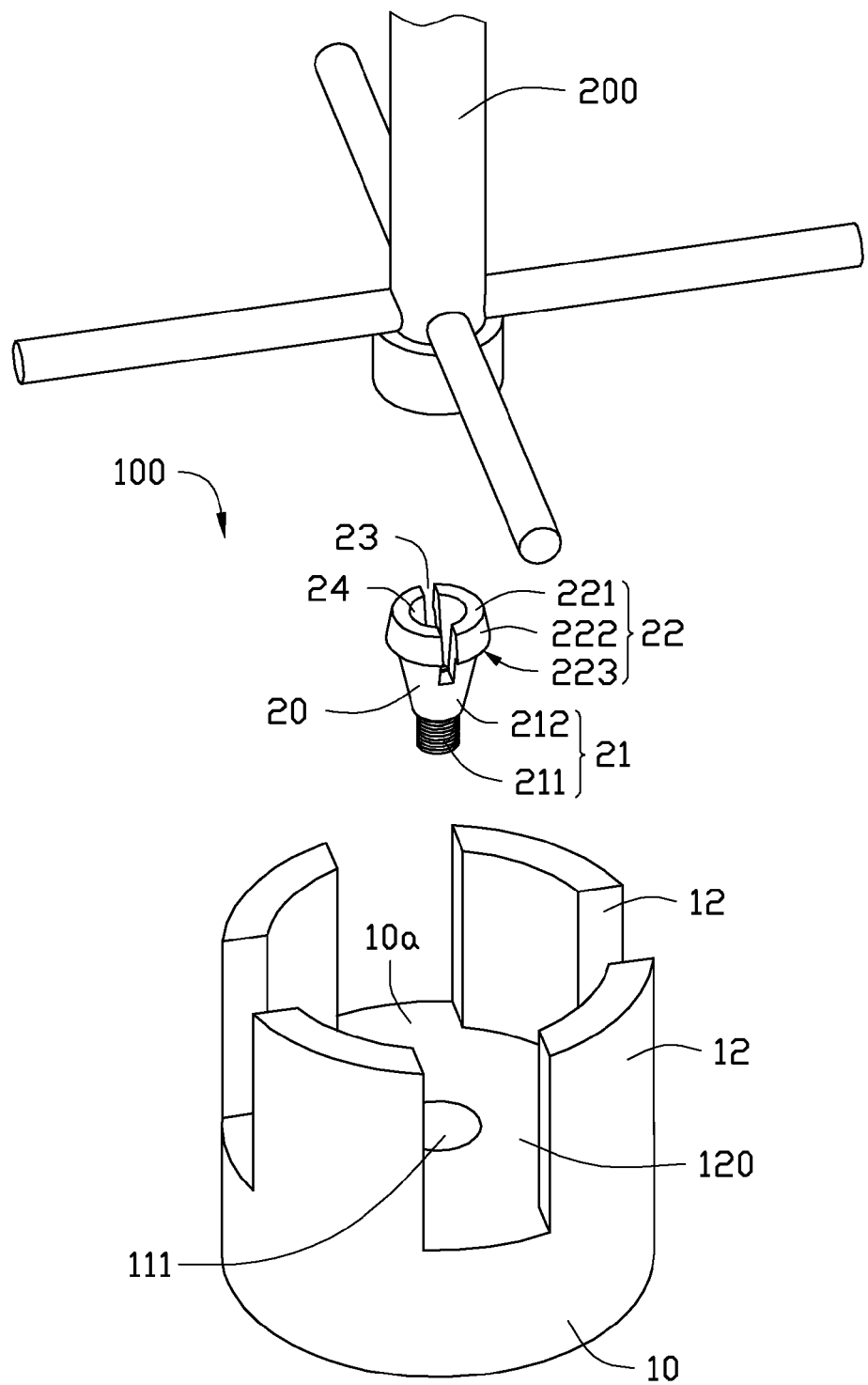
FIG. 2 is an exploded, isometric view of the positioning device of FIG. 1, together with the runner system.
Figure 3:
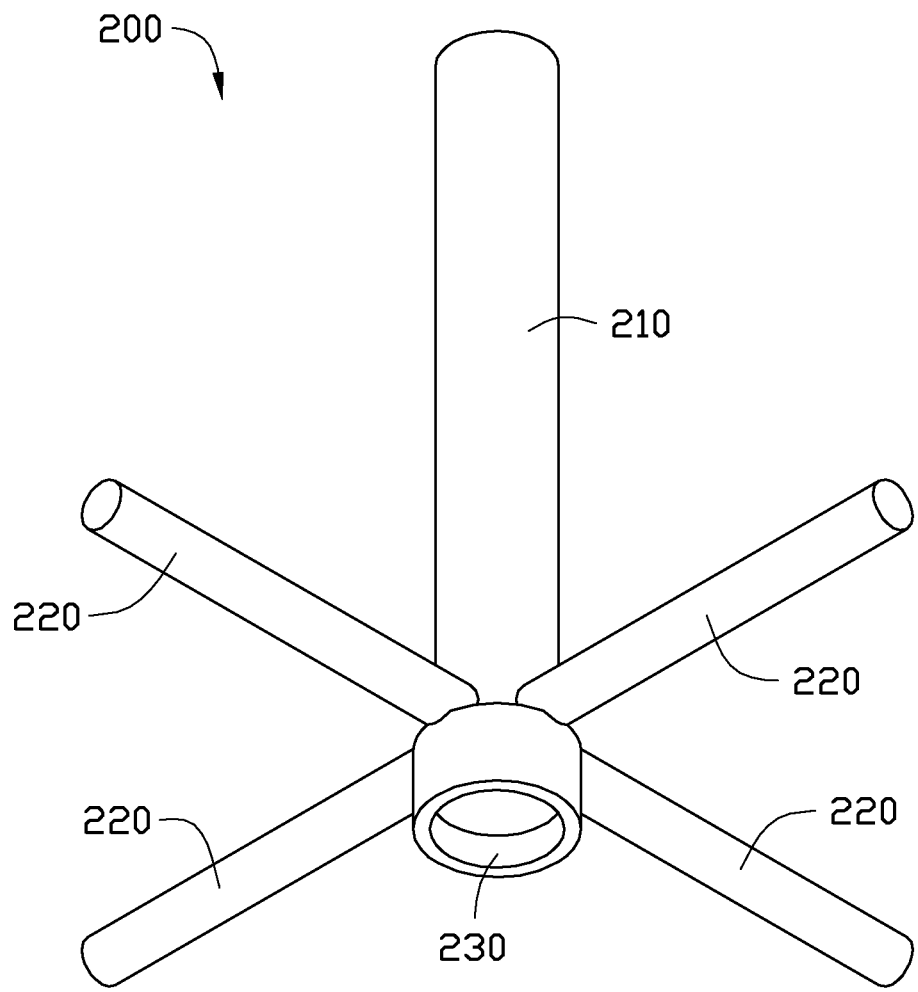
FIG. 3 is an assembled, isometric view of the runner system of FIG. 1.

FIGS. 1-3 illustrate a positioning device 100 for positioning different types of runner systems 200, according to an exemplary embodiment. The runner system 200 includes a main channel 210. One end of the main channel 210 defines a through hole 230. The runner system 200 also includes four branch channels 220 positioned equidistantly around the main channel 210. Each of the branch channels 220 is perpendicular to a central axis of the through hole 230.

The positioning device 100 includes a retainer 10 and a bearing bolt 20.

Figure 4:
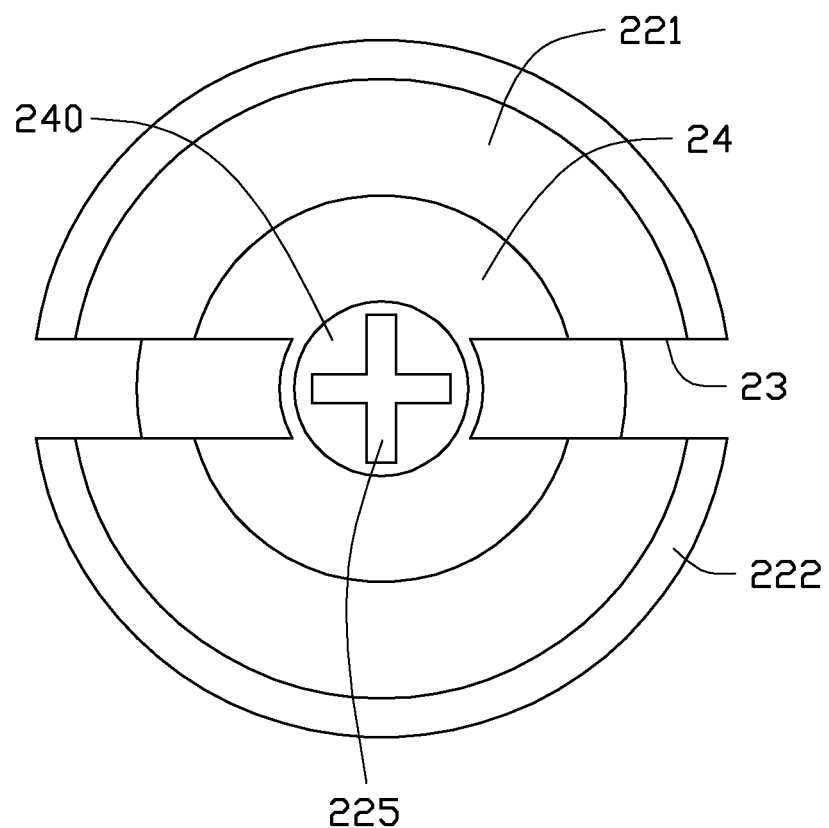
FIG. 4 is a schematic, isometric view of a bearing bolt of the positioning device of FIG. 1.
Figure 5:
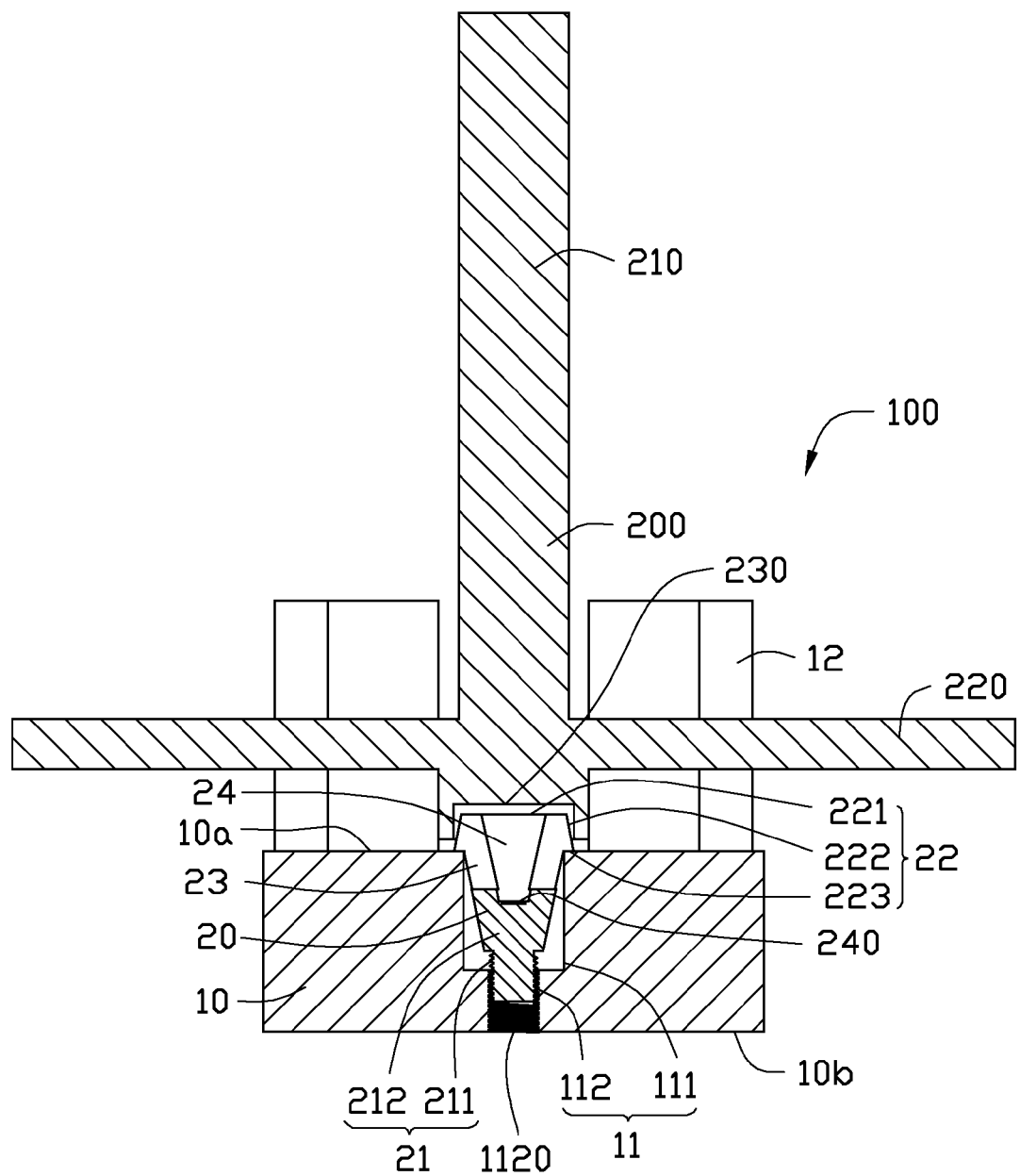
FIG. 5 is a cross-sectional view taken along line V-V of FIG. 1.

Also referring to FIGS. 4-5, the retainer 10 includes a first surface 10a and a second surface 10b facing away from the first surface 10a. The retainer 10 defines a stepped hole 11 passing through the first surface 10a and the second surface 10b. The stepped hole 11 includes a first through hole 111 close to the first surface 10a and a second through hole 112 close to the second surface 10b. The first though hole 111 communicates with the second through hole 112. The diameter of the first though hole 111 is larger than the diameter of the second through hole 112. The retainer 10 has internal threads 1120 formed on an internal wall of the second through hole 112. A number of flanges 12 perpendicularly extend upwards from an edge of the first surface 10a. The flanges 12 are equidistantly positioned around the stepped hole 11, and the flanges 12 are spaced from each other to form a receiving room 120 between each two adjacent flanges 12. In the embodiment, four flanges 12 are equidistantly positioned around the stepped hole 11.

The bearing bolt 20 includes a connection portion 21 for insertion in the stepped hole 11 and a location portion 22. The location portion 22 is connected to the connection portion 21. The connection portion 21 has external threads 211 formed on an external wall of one end away from the location portion 22, and includes a main body 212 connected to and located between the external threads 211 and the location portion 22. The external threads 211 engage with the internal threads 1120 of the second through hole 112, and thereby the bearing bolt 20 is received in and is engaged with the stepped hole 11, with the main body 212 being received in the first through hole 111.

The location portion 22 is substantially in the shape of a truncated-cone, and includes a free end 221, a connection end 223 away from the free end 221, and a ring outer surface 222 connected with the free end 221 and the connection end 223. The diameter of the ring surface 222 gradually reduces from the connection end 223 to the free end 221, the ring surface 222 is therefore a sloped surface, and is configured for engaging with different diameters of the through holes 230 of the different types of runner systems 200, to locate the different types of runner systems 200. The diameter of the connection end 223 is larger than the diameter of the first through hole 111. The location portion 22 defines two slots 23 and a sloped hole 24, thereby facilitating the deformability of the location portion 22. In the embodiment, the sloped hole 24 is a blind hole. The two slots 23 are substantially symmetrical about the center of the sloped hole 24. The diameter of the sloped hole 24 gradually reduces from one end close to the free end 221 to the other end away from the free end 221. A bottom surface 240 of the sloped hole 24 defines a cross recessed pan head 225. The cross recessed pan head 225 is used with a matching tool (not shown) to assemble the bearing bolt 20 into engagement with the stepped hole 11.

In assembly, firstly, the external threads 211 of the bearing bolt 20 engage with the internal threads 1120 of the second through hole 112, with the main body 212 being received in the first through hole 111. Then, the matching tool is used to tighten the bearing bolt 20, thus the connection end 223 is seated on the first surface 10a.

In use, the through hole 230 of the main channel 210 is tightly in contact with the ring surface 222 of the location portion 22, due to the slight deformability of the location portion 22. Each branch channel 220 is received in a respective one of the receiving rooms 120.

It will be understood that the above particular embodiments are shown and described by way of illustration only. The principles and the features of the present disclosure may be employed in various and numerous embodiments thereof without departing from the scope of the disclosure as claimed. The above-described embodiments illustrate the scope of the disclosure but do not restrict the scope of the disclosure.

What is claimed is:

1. A positioning device for positioning a runner system, the positioning device comprising:

a retainer comprising a first surface and a second surface facing away from the first surface, the retainer defining a stepped hole on the first surface; and a bearing bolt comprising a connection portion and a location portion, the connection portion configured for being received in the stepped hole, the location portion connected to the connection portion and extending out of the stepped hole, the location portion being substantially in shape of a truncated-cone, the location portion comprising a free end, a connection end away from the free end, and a ring outer surface connected with the free end and the connection end, the ring outer surface being sloped, a diameter of the ring outer surface gradually reducing from the connection end to the free end.

2. The positioning device of claim 1, wherein the location portion defines two slots and a sloped hole, and the two slots communicate with the sloped hole and are positioned around the sloped hole.

3. The positioning device of claim 2, wherein the two slots are substantially symmetrical about a center of the sloped hole.

4. The positioning device of claim 3, wherein the sloped hole is a blind hole, and a diameter of the sloped hole gradually reduces from one end close to the free end to the other end away from the free end.

5. The positioning device of claim 4, wherein the sloped hole defines a cross recessed pan head in a bottom surface of the sloped hole.

6. The positioning device of claim 1, wherein the stepped hole comprises a first through hole close to the first surface and a second through hole close to the second surface, and the first though hole communicates with the second through hole.

7. The positioning device of claim 6, wherein a diameter of the first though hole is larger than a diameter of the second through hole.

8. The positioning device of claim 6, wherein the retainer has internal threads formed on an internal wall of the second through hole, the connection portion comprises external threads formed on an external wall of one end away from the location portion, the connection portion further comprises a main body connected to and located between the external threads and the location portion, and the external threads are configured for being engaged with the internal threads such that the main body is received in the first through hole.

9. The positioning device of claim 6, wherein a diameter of the connection end is larger than the diameter of the first through hole, and the connection end is seated on the first surface when the connection portion is received in the stepped hole.

10. The positioning device of claim 1, wherein the retainer comprises a plurality of flanges perpendicularly extending upwards from the first surface.

11. The positioning device of claim 10, wherein the plurality of flanges are equidistantly positioned around the stepped hole, and the flanges are spaced from each other to form a receiving room between each two adjacent flanges.

* * * * *